(12) United States Patent
Wang et al.

(10) Patent No.: US 9,181,109 B2
(45) Date of Patent: Nov. 10, 2015

(54) BALLAST WATER TREATMENT SYSTEM

(75) Inventors: Linxing Wang, Wuxi (CN); Jong Hwan Oh, Namku Busan (KR)

(73) Assignee: Wuxi Brightsky Electronic Co., Ltd, Jiangsu (CN)

( * ) Notice: Subject to any disclaimer, the term of this patent is extended or adjusted under 35 U.S.C. 154(b) by 853 days.

(21) Appl. No.: 13/266,734

(22) PCT Filed: Oct. 14, 2010

(86) PCT No.: PCT/CN2010/077750

§ 371 (c)(1),
(2), (4) Date: Oct. 27, 2011

(87) PCT Pub. No.: WO2011/044845

PCT Pub. Date: Apr. 21, 2011

(65) Prior Publication Data

US 2012/0043270 A1 Feb. 23, 2012

(30) Foreign Application Priority Data

Oct. 16, 2009 (KR) .................. 10-2009-0098906

(51) Int. Cl.
C02F 1/36 (2006.01)
C02F 1/32 (2006.01)
(Continued)

(52) U.S. Cl.
CPC .................. *C02F 1/325* (2013.01); *B63J 4/002* (2013.01); *C02F 1/36* (2013.01); *C02F 1/38* (2013.01); *C02F 2103/008* (2013.01); *C02F 2201/3227* (2013.01)

(58) Field of Classification Search
USPC .......... 422/20, 128, 184; 210/748.01, 748.02, 210/153, 243, 198.1
See application file for complete search history.

(56) References Cited

U.S. PATENT DOCUMENTS 3,672,823 A * 6/1972 Boucher .................. 422/20

5,137,580 A * 8/1992 Honda ..................... 134/1
(Continued)

FOREIGN PATENT DOCUMENTS

CN 101503221 A 8/2009
CN 101525172 A 9/2009
(Continued)

OTHER PUBLICATIONS

International Search Report, dated Jan. 20, 2011, corresponding to PCT/CN2010/077750, 7 pages.

*Primary Examiner* — Walter D Griffin
*Assistant Examiner* — Cameron J Allen
(74) *Attorney, Agent, or Firm* — Christie, Parker & Hale, LLP (57) ABSTRACT

The present invention provides a ballast water treatment system, comprising a centrifugal separator, an ultrasonic sterilizer, and an ultraviolet sterilizer, wherein, the centrifugal separator is designed to separate large-particle of foreign matters from the ballast water by centrifugal separation by means of density difference; the ultrasonic sterilizer is arranged at the back of the centrifugal separator, and is designed to accomplish ultrasonic sterilization for the ballast water passing through the centrifugal separator; the ultrasonic sterilizer comprises a pipe that is used for sterilization of the ballast water and ultrasonic irradiation unit that perform ultrasonic irradiation for the ballast water passing through the pipe; the ultraviolet sterilizer accomplishes sterilization by means of ultraviolet irradiation for the ballast water passing through the ultrasonic sterilizer. The ballast water treatment system provided in the present invention can effectively accomplish sterilization for the ballast water that flows into the ballast tank of ship, and thereby prevent all kinds of pollution to seawater related with ballast water discharge, and greatly improve reliability of application.

9 Claims, 12 Drawing Sheets

(51) Int. Cl.
*B63J 4/00* (2006.01)
*C02F 1/38* (2006.01)
*C02F 103/00* (2006.01)

(56) References Cited

U.S. PATENT DOCUMENTS

| | | | |
|---|---|---|---|
| 6,402,965 | B1 | 6/2002 | Sullivan et al. |
| 7,354,556 | B2 * | 4/2008 | Perkins .................. 422/128 |
| 2005/0040091 | A1 * | 2/2005 | Nilsen et al. ................ 210/198.1 |
| 2005/0271575 | A1 * | 12/2005 | Ciampi et al. ............. 423/594.2 |
| 2006/0021950 | A1 * | 2/2006 | Crandall et al. ............... 210/748 |
| 2008/0073260 | A1 * | 3/2008 | Ido ................................ 210/202 |

FOREIGN PATENT DOCUMENTS

| | | |
|---|---|---|
| CN | 101531410 A | 9/2009 |
| DE | 10 2006 027 459 A1 | 12/2007 |
| JP | 2004-202322 | 7/2004 |

* cited by examiner

BALLAST WATER TREATMENT SYSTEM

CROSS-REFERENCE TO RELATED APPLICATION(S)

This application is a National Phase Patent Application and claims the priority to and benefit of International Application Number PCT/CN2010/077750, filed on Oct. 14, 2010, which claims priority of Korean Patent Application Number 10-2009-0098906, filed on Oct. 16, 2009.

FIELD OF THE INVENTION

The present invention relates to a water treatment system, in particular to a ballast water treatment system.

BACKGROUND OF THE INVENTION

For large ships, in order to keep its balance during sailing, appropriate volume of seawater needs to be stored in the ballast tank at the bottom of the ship. The seawater or fresh water stored in the ballast tank for keeping balance of ship is known as ballast water.

Usually, ballast water is stored in the ballast tank near the port of departure, and after a voyage discharged from the ballast tank in the offshore area near the port of destination.

However, the ballast water charged into the ballast tank of the ship in the offshore area near the port of departure contains a variety of microbes that live in the offshore area or silt, and therefore the ballast water will pollute the offshore environment near the port of destination when it is discharged.

To solve the problem, a treaty for regulation and management of ship ballast water and sediments (hereinafter referred as "Treaty for Ballast Water") is adopted, and it specifies the discharge standard of ballast water. Ballast water is prohibited to discharge if the discharge standard is not met.

To meet the ballast water discharge standard, a variety of proposals for installation of ballast water treatment system in ship are put forth. The Korean Patent Application No. 10-0743946, titled as "Apparatus for Purifying Ballast Water and Ship Mounted the Same", describes a method, wherein the ballast water stored in the tank is treated with a filtering apparatus during storage, and the ballast water is sterilized with a sterilizing apparatus before it is discharged, which is to say, large-particle materials are filtered off with the filtering apparatus, and then a variety of planktonic organisms or microbes are sterilized under UV irradiation with the sterilizing equipment.

The present ballast water treatment systems mounted inside ships are not highly reliable, and their sterilization and purification effects are not ideal. Therefore, the ballast water still brings pollution to the offshore environment of the port of destination.

SUMMARY OF THE INVENTION

To overcome the drawbacks of the prior art, the object of the present invention is to provide a ballast water treatment system, which has high reliability and can effectively accomplish sterilization of the ballast water that flows into the ship, and thereby can prevent pollution resulting from discharge of ballast water.

To solve the above problem, the ballast water treatment system provided in the present invention comprises a centrifugal separator, an ultrasonic sterilizer, and an ultraviolet sterilizer, wherein:

the centrifugal separator is designed to separate large particle of foreign matters in the ballast water by centrifugal separation by means of density difference;

the ultrasonic sterilizer is arranged at the back of the centrifugal separator, and is designed to accomplish ultrasonic sterilization for the ballast water in the centrifugal separator;

the ultrasonic sterilizer comprises a pipe that is used for sterilization of the ballast water and ultrasonic irradiation unit that perform ultrasonic irradiation for the ballast water in the pipe;

the ultraviolet sterilizer is designed to accomplish sterilization of the ballast water in the ultrasonic sterilizer by means of ultraviolet irradiation.

Wherein, the ultrasonic irradiation unit comprises: an ultrasonic vibrator that generates ultrasonic vibration and a vibrating plate that is mounted at the fore-end of the ultrasonic vibrator and is designed to transfer the ultrasonic wave generated by the ultrasonic vibrator to the ballast water in the pipe.

Wherein, a plurality of vibrating plates are aligned along the length direction of the pipe for sterilization, and are mounted along the circumference of the pipe for sterilization, and each vibrating plate comprises a plurality of ultrasonic vibrators in the length direction of the vibrating plate.

Wherein, the ultrasonic vibrator comprises high-frequency vibrators and low-frequency vibrators, which are mounted alternately in the length direction of the vibrating plate.

Wherein, in order to transfer ultrasonic wave in the pipe for sterilization, a roll shape metal mesh which is tangent to the vibrating plate is mounted in the pipe for sterilization.

Wherein, an acoustic material is mounted at the inside of the ultrasonic sterilizer, and a protective cover that envelops the ultrasonic vibrators is mounted at the outside of the pipe for sterilization.

Wherein, the diameter of the discharge pipe of the centrifugal separator increases gradually, and the flow velocity of fluid increases, thereby the centrifugal force increases.

Wherein, a protective cover for the ultrasonic irradiation unit is mounted on the ultrasonic sterilizer.

Wherein, the ultraviolet sterilizing equipment is further equipped with an explosion-proof cover plate.

As described above, in the present invention, with a reasonable combination of centrifugal separator, ultrasonic sterilizer, and ultraviolet sterilizer, the ballast water in the ship can be sterilized effectively, so as to prevent a variety of sea pollution related with discharge of ballast water. Therefore, the ballast water treatment system provided in the present invention has high reliability.

<Description of the Symbols>

| 10 | Water Pump | 20 | Ballast Tank |
|---|---|---|---|
| 100 | Centrifugal Separator | 200 | Ultrasonic Sterilizer |
| 210 | Pipe for Sterilization | 220 | Ultrasonic Irradiation Unit |
| 221 | Ultrasonic Vibrator | 222 | Vibrating Plate |
| 230 | Protective Cover | 231 | Acoustic Material |
| 240 | Metal Mesh | 241~246 | Upper Vibrating Plate |
| 251, 252, 256 | Lower Vibrating Plate | 261 | Explosion-Proof Protective Cover for Ultrasonic Vibrator |
| 300 | Ultraviolet Sterilizer | | |

DETAILED DESCRIPTION OF THE EMBODIMENTS

For those skilled in the art to implement the present invention, hereunder the embodiments of the present invention will be described in detail with reference to the accompanying drawings. However, it should be appreciated that the present invention can be implemented in different forms, and not limited to the embodiments described here. In addition, for the clear illustration on the drawings, parts that are unnecessary for description are omitted, and same drawing symbols refer to similar parts throughout the whole specification.

While the present invention is described in detail with reference to some embodiments, those embodiments are not intended to limit the present invention. Those skilled in the art can make modifications to the technical scheme described in the embodiments, or make equivalent replacements to some technical features of the embodiments. However, any modification, equivalent replacement, or improvement to the embodiments without departing from the spirit and principle of the present invention shall be deemed as falling into the protected scope of the present invention.

To make the composition of the ballast water treatment system more effective, the ultrasonic sterilizer and ultraviolet sterilizer, which are components of the ballast water treatment system, are constituted with two models in the specification of the present invention.

Embodiment 1

Figure 1A:
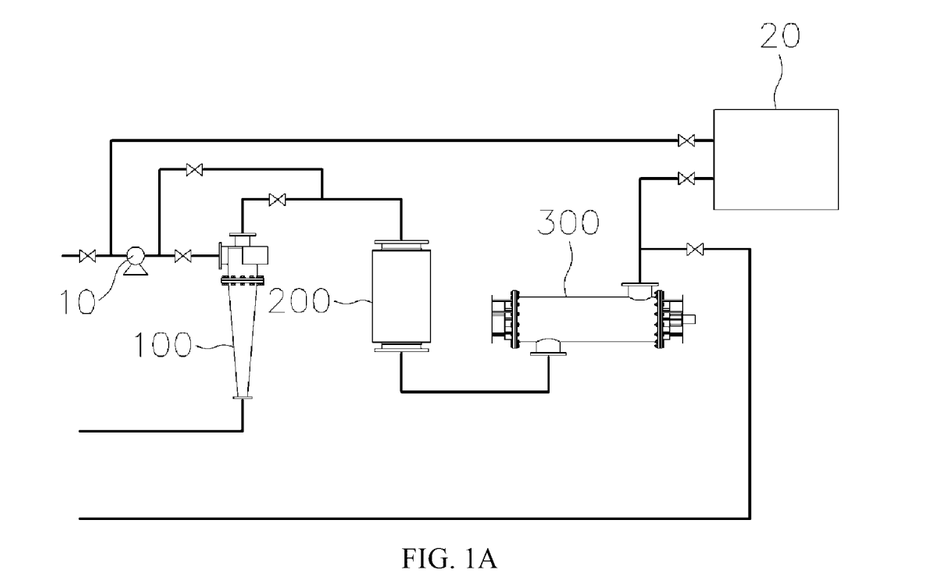
FIG. 1A and FIG. 1B are system diagrams of embodiment 1 of the ballast water treatment system provided in the present invention.
Figure 1B:
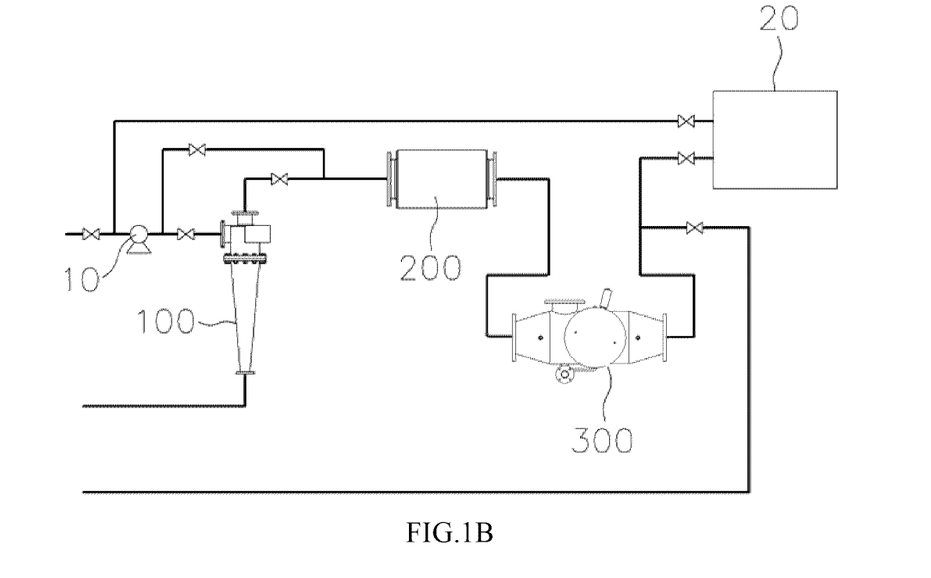

FIG. 1A and FIG. 1B are system diagrams of embodiment 1 of the ballast water treatment system provided in the present invention. As shown in FIG. 1A and FIG. 1B, the ballast water treatment system comprises: a water pump (10), a ballast tank (20), a centrifugal separator (100), an ultrasonic sterilizer (200), and an ultraviolet sterilizer (300).

Figure 2:
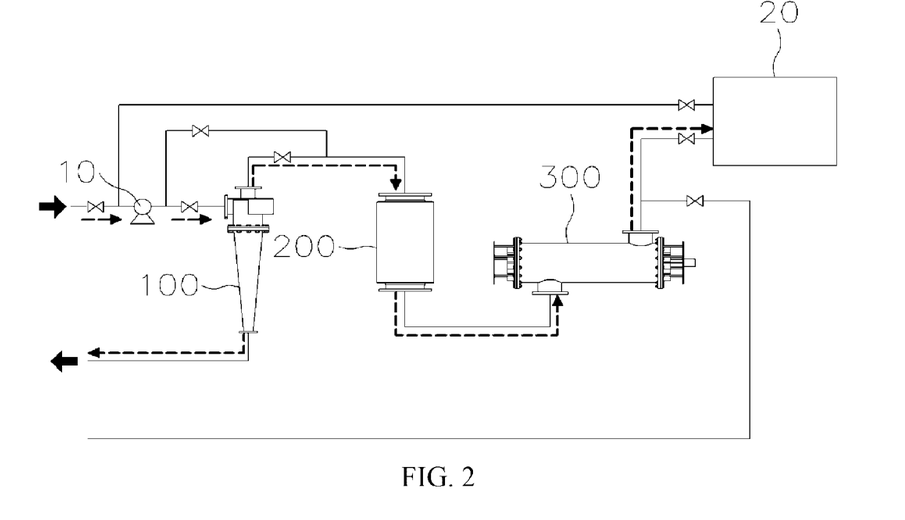
FIG. 2 is a flow diagram of fluid when ballast water flows into the ballast tank on the basis of FIG. 1A and FIG. 1B.

FIG. 2 is a flow diagram of fluid when ballast water flow into the ballast tank on the basis of FIG. 1A and FIG. 1B. As shown in FIG. 2, the process of charging ballast water into the ballast tank (20) is as follows: the ballast water flows into the ballast tank (20) through the water pump (10), centrifugal separator (100), ultrasonic sterilizer (200), and ultraviolet sterilizer (300).

Figure 3:
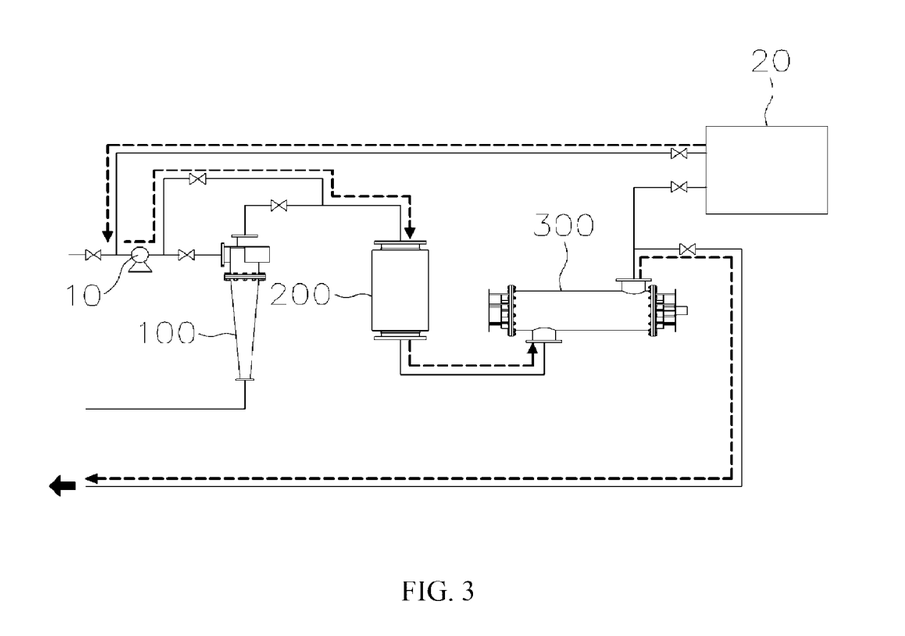
FIG. 3 is a flow diagram of fluid when ballast water discharges on the basis of FIG. 1A and FIG. 1B.

FIG. 3 is a flow diagram of fluid when ballast water discharges on the basis of FIG. 1A and FIG. 1B. As shown in FIG. 3, the process of discharging ballast water from the ballast tank (20) is as follows: the ballast water is discharged to the outside from the ballast tank (20) through the water pump (10), ultrasonic sterilizer (200), and ultraviolet sterilizer (300).

In the ballast water treatment system provided in the present invention, the ballast water flows through the centrifugal separator (100) when it is ballasted, but it doesn't flows through the centrifugal separator (100) when it is discharged, since it has been treated by centrifugal separation.

Figure 4A:
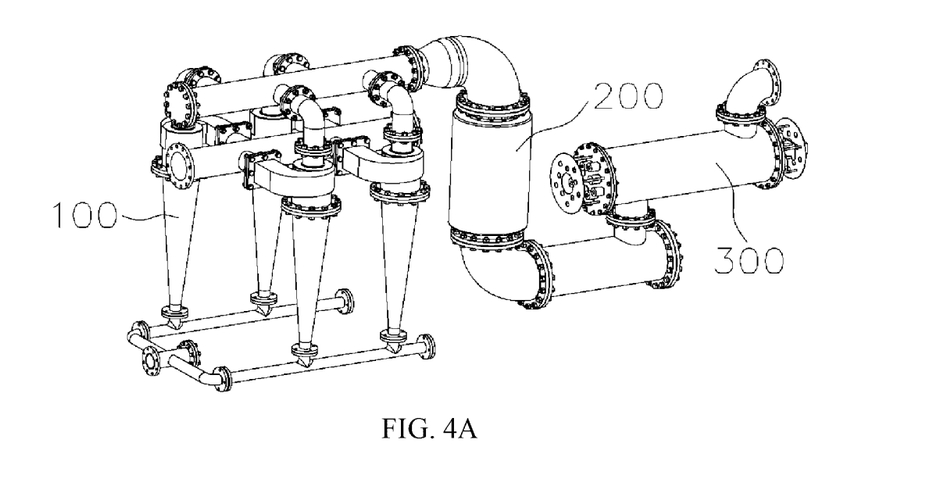
FIG. 4A and FIG. 4B are 3D diagrams of main components of the ballast treatment system shown in FIG. 1A and FIG. 1B.
Figure 4B:
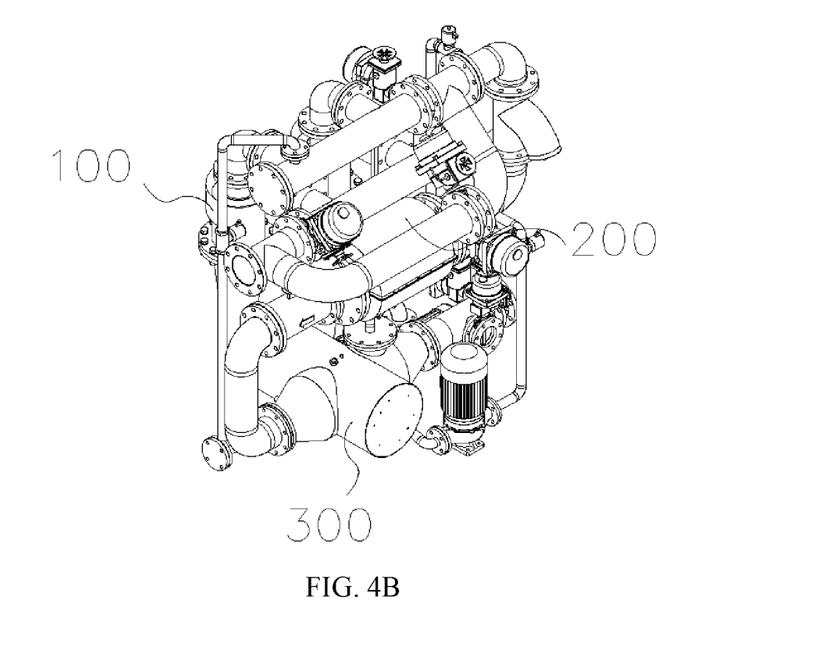
Figure 5A:
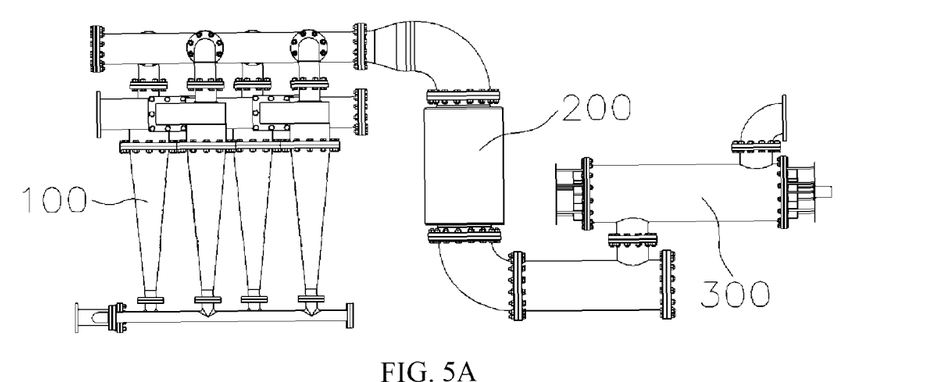
FIG. 5A and FIG. 5B are front views of FIG. 4A and FIG. 4B.
Figure 5B:
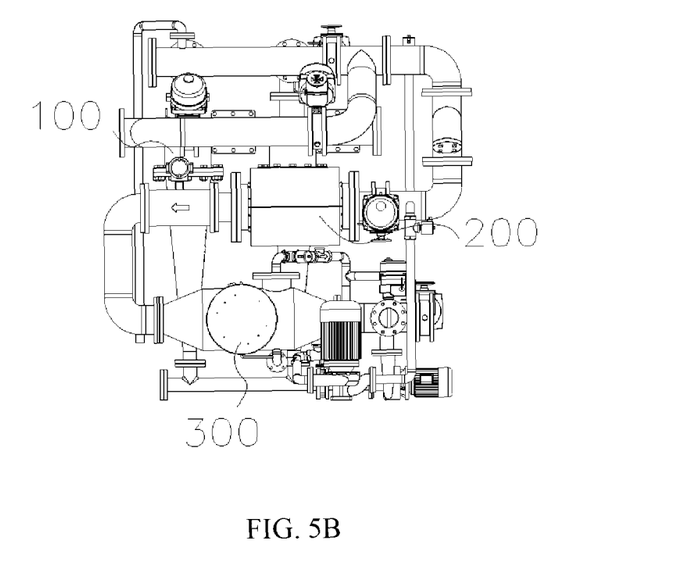

FIG. 4A and FIG. 4B are 3D diagrams of main components of FIG. 1A and FIG. 1B; FIG. 5A and FIG. 5B are front views of FIG. 4A and FIG. 4B. As shown in FIG. 4A, FIG. 4B, FIG. 5A, and FIG. 5B, the main structure of the system is a structure in which the centrifugal separator (100), ultrasonic sterilizer (200), and ultraviolet sterilizer (300) are arranged sequentially in the flow direction of fluid as shown in FIG. 4A, FIG. 4B, FIG. 5A, and FIG. 5B.

Figure 6:
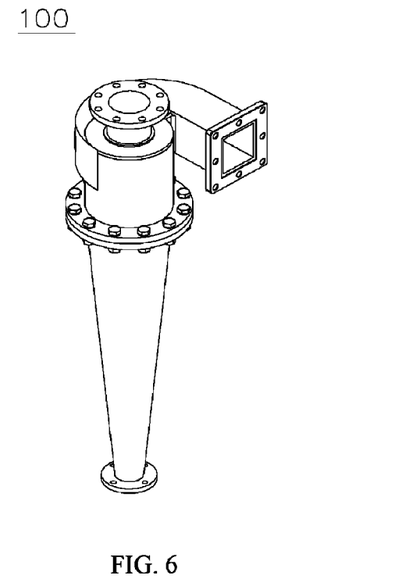
FIG. 6 is a 3D diagram of the centrifugal separator shown in FIG. 4A and FIG. 4B.

FIG. 6 is a 3D diagram of the centrifugal separator shown in FIG. 4A and FIG. 4B. As shown in FIG. 6, the centrifugal separator (100) in this embodiment is a cyclone centrifugal separator.

The centrifugal separator (100) is designed to separate large-particle of foreign matters from the ballast water by centrifugal separation by means of density difference, when the ballast water flows into the ballast tank.

That is to say, when the ballast water flows into the ballast tank through the centrifugal separator (100), it rotates in the centrifugal separator (100) and therefore centrifugal force is generated in the rotating water; as a result, high-density particles gather at the conical inner wall and are discharged to the outside through the cone vertex. After the high-density particles are separated, the ballast water flows out from the top of the centrifugal separator (100), and then flows into the next process, i.e., ultrasonic sterilizer (200).

Figure 7:
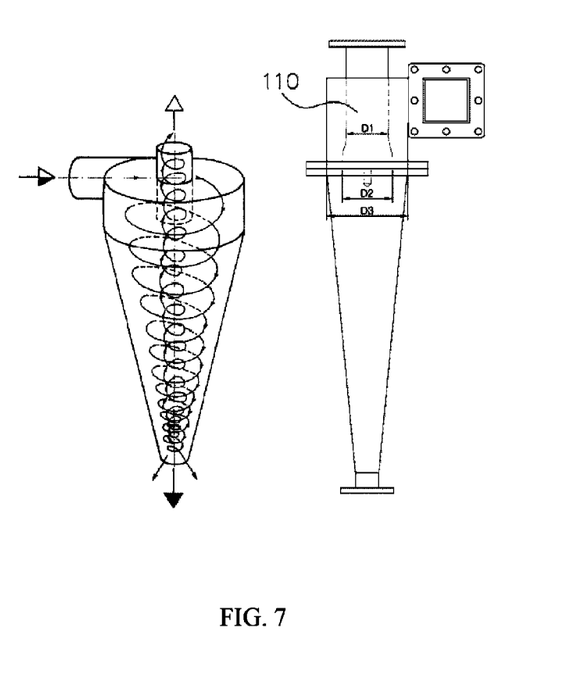
FIG. 7 is a schematic diagram of operation of FIG. 6.

FIG. 7 is a schematic diagram of operation of FIG. 6. As shown in FIG. 7, the diameter (D1, D2) of the discharge pipe (110) is enlarged from D1 to D2 gradually, so that the ballast water rotating inside flows faster. That design is to increase the centrifugal force of ballast water (center distance×square of flow velocity) at the inlet caliber (D2) of the discharge pipe (110), so as to improve the efficiency of centrifugal separator.

The centrifugal separator (100) is connected to the ultrasonic sterilizer (200) at the backend.

The ultrasonic sterilizer (200) is provided to carry out ultrasonic sterilization for the ballast water through the centrifugal separator (100).

Ultrasonic wave is sound in a frequency range beyond the hearing range of human being, and carries very powerful energy. Ultrasonic wave is transferred to liquids in the form of dilatational wave, and thereby generates a strong cavitation effect in the liquids.

Such ultrasonic wave is usually used for washing or cleaning. For example, the ultrasonic wave can be used in ultrasonic equipment for medical diagnosis, for ultrasonic cleaning of optical glasses, for cleaning of automotive parts, and for cleaning of ceramic, etc. (ultrasonic washing machine, ultrasonic disintegrator, cleaning of dental medical equipment, and cleaning of noble metals, etc.)

In addition to above contents, the sterilizing effect of ultrasonic irradiation in liquid has been proved in many literatures. However, since ultrasonic irradiation will generate very big noise, it is not widely used in industrial field for sterilization purpose yet.

In the ballast water treatment system of present invention, the ultrasonic sterilizer (200) is arranged at the fore end of the ultraviolet sterilizer (300), to kill planktonic organisms or microbes by means of the perfect combination of ultrasonic sterilizer (200) and ultraviolet sterilizer (300), to ensure the treated ballast water comply with the discharge standard of ballast water.

Especially, even though planktonic organisms or microbes are not completely killed in the ultrasonic sterilizer (200), they are damaged severely in ultrasonic vibration, and then will be killed completely when they pass through the ultraviolet sterilizer (300).

Figure 8:
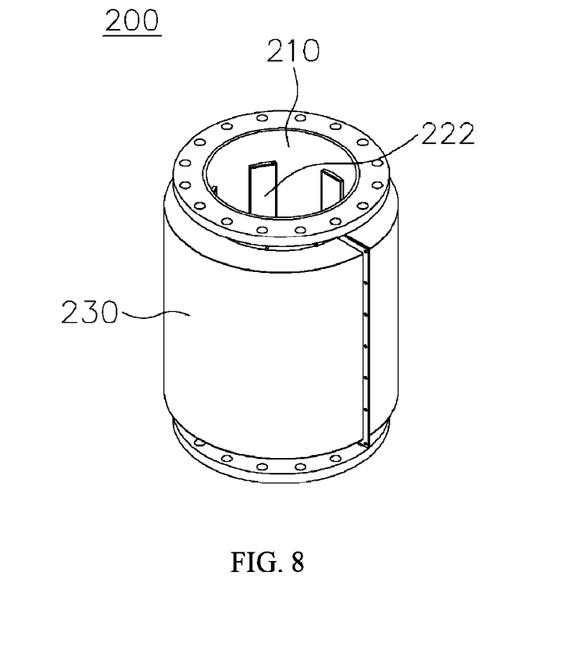
FIG. 8 is a 3D schematic diagram of structure 1 of the ultrasonic sterilizer shown in FIG. 4A and FIG. 4B.

FIG. 8 is a 3D schematic diagram of structure 1 of the ultrasonic sterilizer shown in FIG. 4A and FIG. 4B. As shown in FIG. 8, a protective cover (230) is arranged outside of the pipe for sterilization (210) of the ultrasonic sterilizer (200).

Figure 9A:
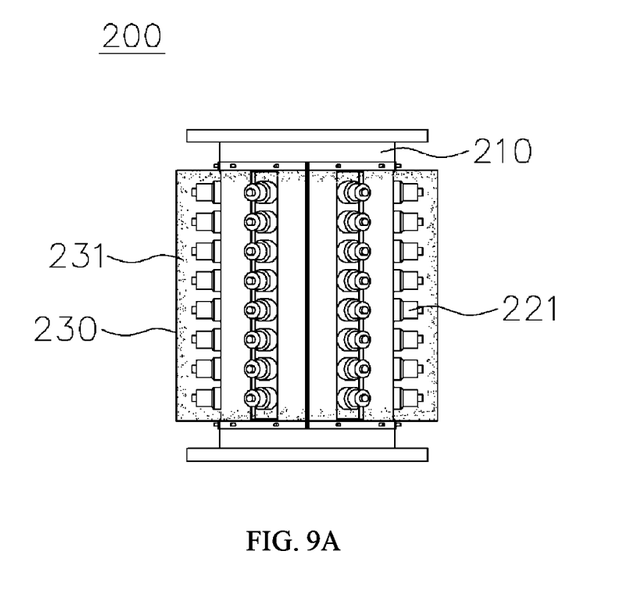
FIG. 9A and FIG. 9B are longitudinal section views of FIG. 8.
Figure 9B:
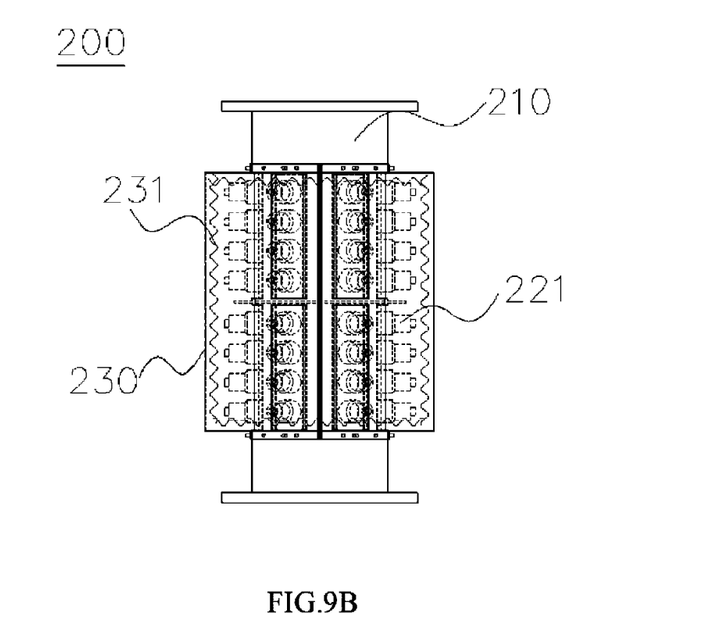

FIG. 9A and FIG. 9B are longitudinal section views of FIG. 8. As shown in FIG. 9A and FIG. 9B, the ultrasonic sterilizer further comprises ultrasonic vibrators (221) and an acoustic material (231).

Figure 10:
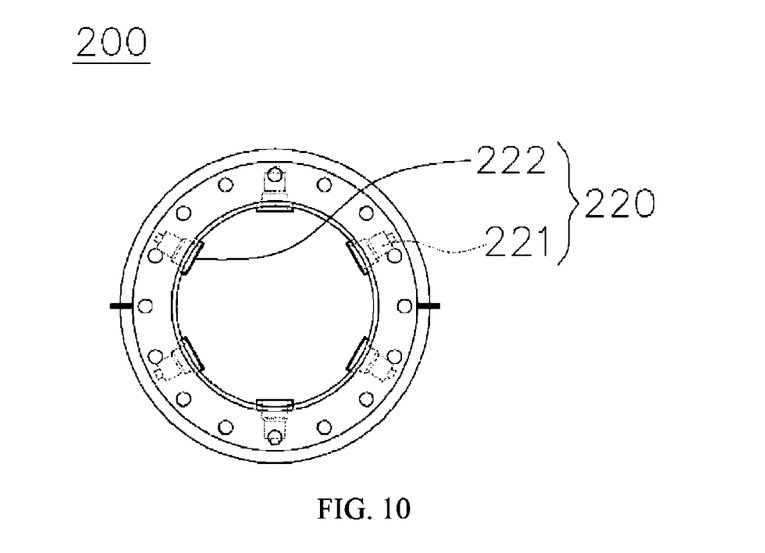
FIG. 10 is a plan view of FIG. 8.
Figure 11A:
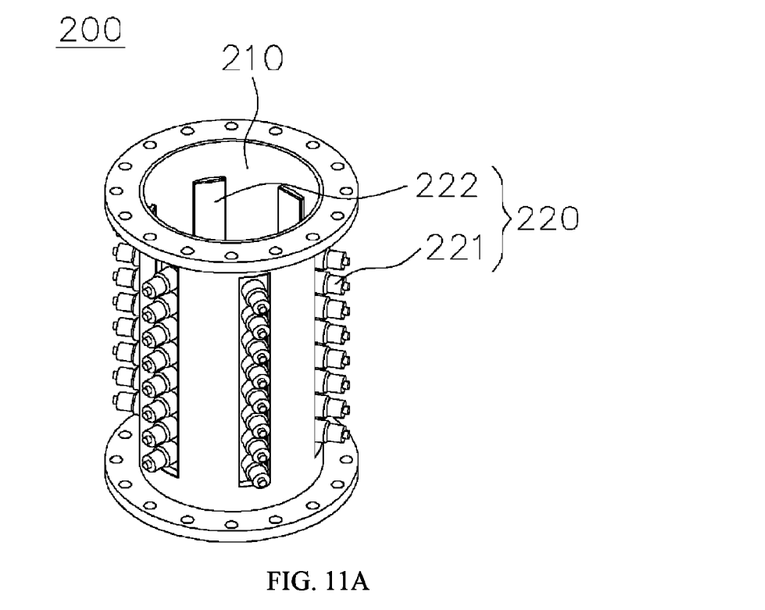
FIG. 11A and FIG. 11B are 3D diagrams of FIG. 8, with the protective cover removed.
Figure 11B:
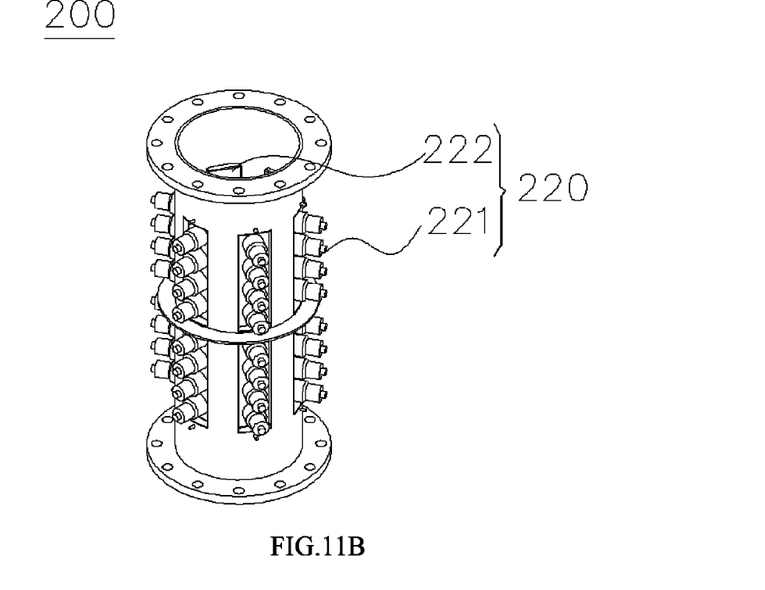

FIG. 10 is a plan view of FIG. 8; FIG. 11A and FIG. 11B are 3D views of FIG. 8, with the protective cover removed. As shown in FIG. 10, FIG. 11A, and FIG. 11B, the ultrasonic sterilizer further comprises vibrating plate (222). The ultrasonic vibrator (221) and vibrating plate (222) form ultrasonic irradiation unit (220).

The ultrasonic sterilizer (200) comprises pipe for sterilization (210), ultrasonic irradiation unit (220), and protective cover (230).

The pipe for sterilization (210) is a tubular part, through which the ballast water can flow.

The pipe for sterilization (210) is equipped with flanges at both ends for pipe connection.

The pipe for sterilization (210) has a plurality of ultrasonic irradiation unit (220) mounted on the surface.

The ultrasonic irradiation unit (220) irradiates ultrasonic wave into the ballast water flowing through the pipe for sterilization (210).

The ultrasonic irradiation unit (220) comprises an ultrasonic vibrator (221) that generates ultrasonic vibration and a vibrating plate (222) that is arranged ahead of the ultrasonic vibrator (221) and tangent to the ballast water to transfer the ultrasonic wave generated by the ultrasonic vibrator into the ballast water.

The ultrasonic vibrator (221) converts electric energy into mechanical energy to generate ultrasonic vibration. A variety of forms of ultrasonic vibrators are standardised.

In this embodiment, the vibrating plates (222) are aligned along the length direction of the pipe for sterilization (210) and tangent to the flow direction of ballast water.

In addition, a plurality of vibrating plates (222) are aligned along the pipe for sterilization (210) on the surface. In this embodiment, 6 vibrating plates (222) are aligned at an even interval with gap.

In addition, a plurality of ultrasonic vibrators (221) are arranged in the length direction of each vibrating plate (222).

Figure 12:
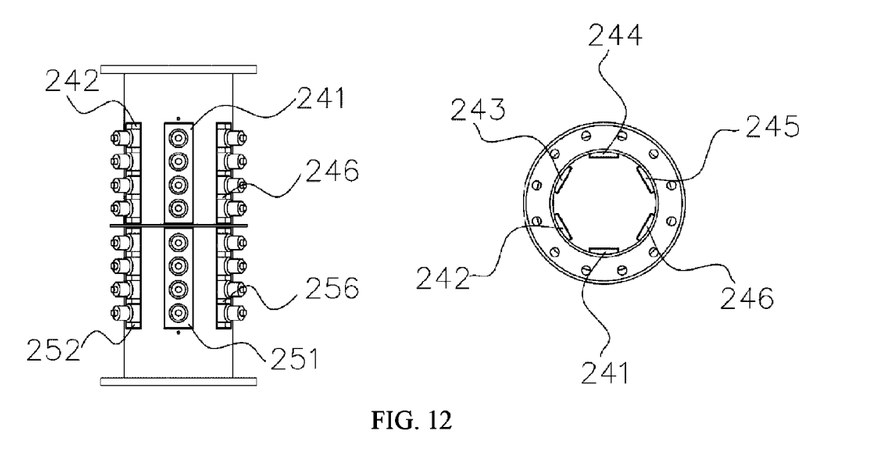
FIG. 12 is a 3D schematic diagram of structure 2 of the ultrasonic sterilizer shown in FIG. 4A and FIG. 4B.

FIG. 12 is a 3D schematic diagram of structure 2 of the ultrasonic sterilizer shown in FIG. 4A and FIG. 4B. As shown in FIG. 12, in order to improve the sterilizing effect of the ultrasonic sterilizer, upper vibrating plates (241, 242, 243, 244, 245, 246) and lower vibrating plates (251, 252, 256) are provided on the ultrasonic sterilizer. By adjusting the frequencies of ultrasonic vibrators fixed to the upper vibrating plates (241, 242, 243, 244, 245, 246) and lower vibrating plates (251, 252, 256), the cavitation effect in the liquid can be enhanced.

For example, 40 kHz high-frequency ultrasonic wave is generated by the 3 upper vibrating plates (241, 243, 245) and 3 lower vibrating plates (252, 254, 256), and 28 kHz lower-frequency ultrasonic wave is generated by the other 3 upper vibrating plates (242, 244, 246) and 3 lower vibrating plates (251, 253, 255), so that the high-frequency ultrasonic wave and low-frequency ultrasonic wave interact with each other in the liquid, resulting in stronger cavitation effect.

That is because: high-frequency ultrasonic wave has high degree of linearity and therefore can transfer wavelength intensely into liquid; low-frequency ultrasonic wave can transfer wavelength more intensely, though it has lower linearity compared with high-frequency ultrasonic wave. With that feature, ultrasonic waves with different frequencies can interact with each other in the liquid.

Whereas the ultrasonic sterilizer (200) generates very high noise due to ultrasonic vibration, therefore, the ultrasonic vibrator (221) must have exterior protection.

To that end, a protective cover (230) is arranged outside of the pipe for sterilization (210).

The protective cover (230) has acoustic material (231) inside. The protective cover (230) envelops the ultrasonic vibrator (221) and is arranged outside of the pipe for sterilization (210), so as to reduce noise and protect the ultrasonic vibrator (221) from outside.

Figure 13A:
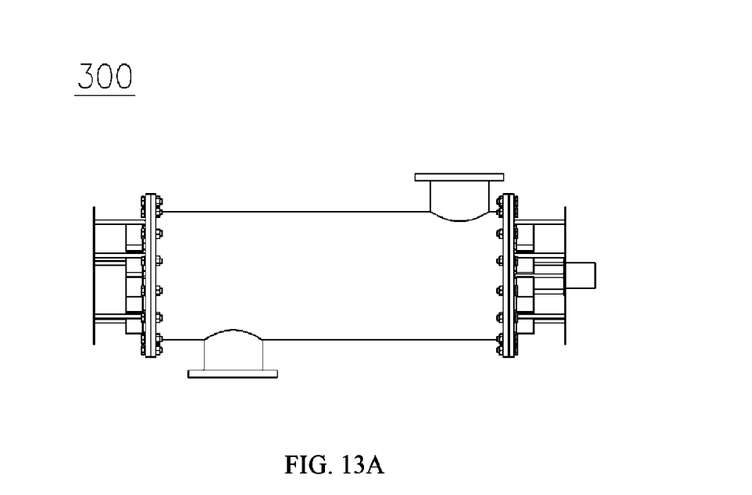
FIG. 13A and FIG. 13B are front views of the ultraviolet sterilizer shown in FIG. 4A and FIG. 4B.
Figure 13B:
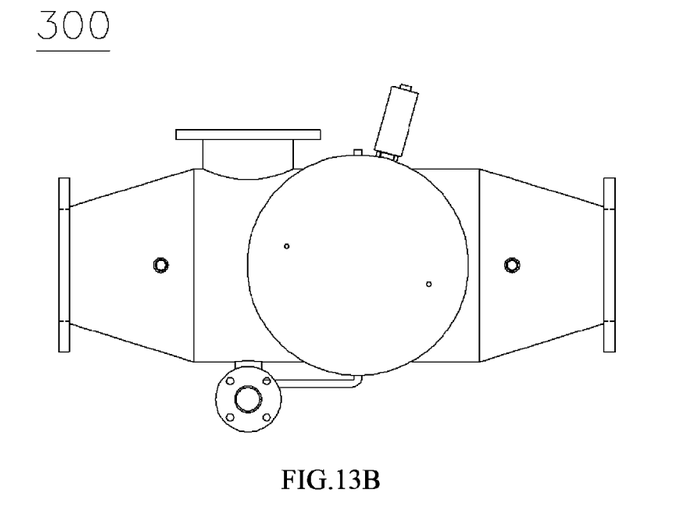

FIG. 13A and FIG. 13B are front views of the ultraviolet sterilizer shown in FIG. 4A and FIG. 4B. As shown in FIG. 13A and FIG. 13B, the ultraviolet sterilizer (300) is connected to the back end of the ultrasonic sterilizer (200). The ultraviolet sterilizer (300) is designed to kill planktonic organisms and microbes in the ballast water passing through the ultrasonic sterilizer by means of ultraviolet irradiation.

To achieve that purpose, the ultraviolet sterilizer (300) is equipped with ultraviolet lamp.

Since the ultraviolet sterilizer (300) is well known in the art, it will not be described further here.

Figure 14:
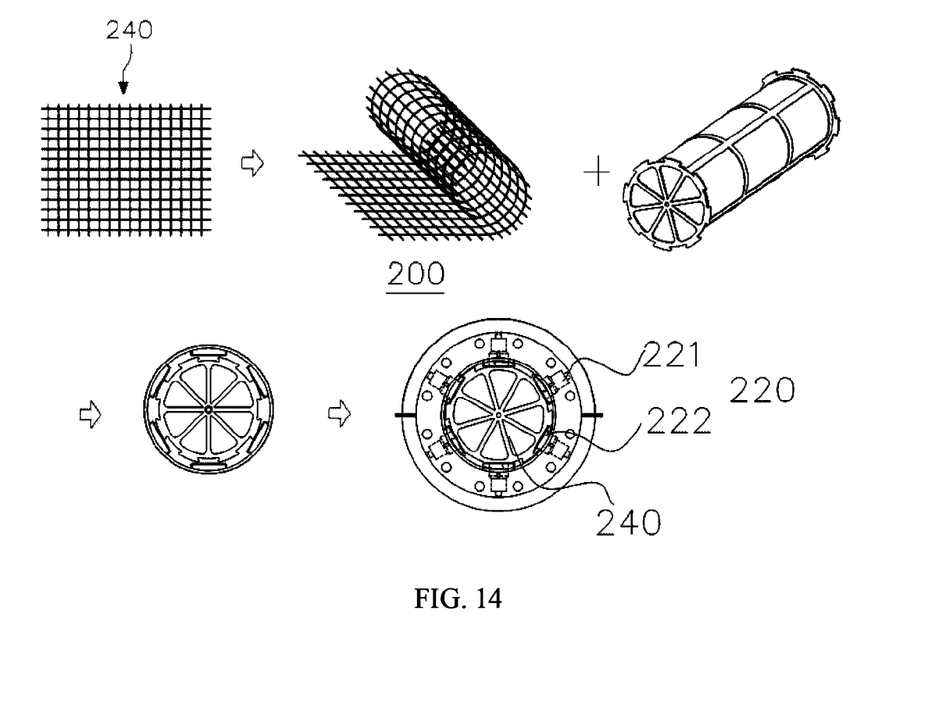
FIG. 14 shows the metal mesh arranged in the ultrasonic sterilizer for more efficiently transferring ultrasonic wave.

FIG. 14 shows a metal mesh arranged to enable the ultrasonic sterilizer to transfer ultrasonic wave more effectively. As shown in FIG. 14, the metal mesh (240) arranged to enable the ultrasonic sterilizer to transfer ultrasonic wave more effectively is rolled into circular shape, and arranged inside of the pipe for sterilization (210) such that the outside of circular metal mesh (240) is tangent to the vibrating plate (222).

Thus, the ultrasonic vibration from the vibrating plate (222) can be transferred not only into the ballast water but also to the center of the pipe for sterilization (210) effectively via the metal mesh (240).

Since the metal mesh (240) is a net, it will not hinder the flow of ballast water.

Embodiment 2

Figure 15:
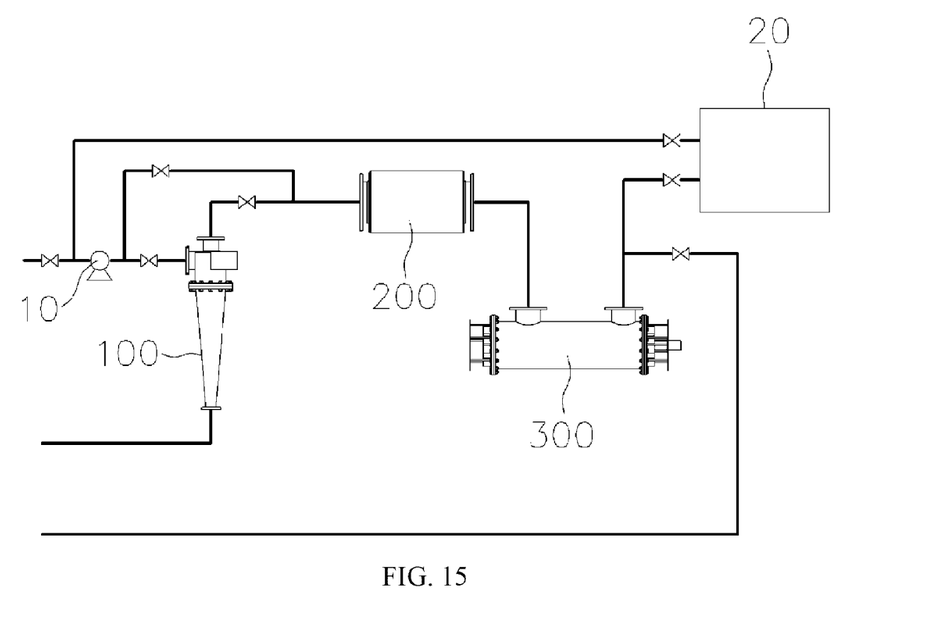
FIG. 15 is a system diagram of embodiment 2 of the ballast water treatment system provided in the present invention.
Figure 16:
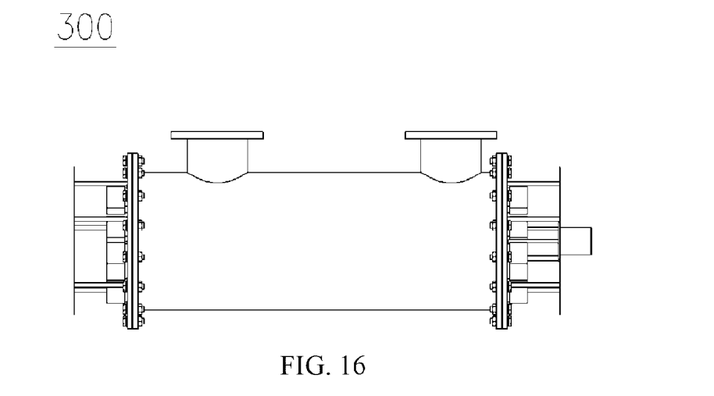
FIG. 16 is a front view of the ultraviolet sterilizer shown in FIG. 15.

FIG. 15 is a system diagram of the ballast water treatment system in embodiment 2 of the present invention; FIG. 16 is a front view of the ultraviolet sterilizer shown in FIG. 15. As shown in FIG. 16 and FIG. 15, the structure of the ballast water treatment system provided in the present invention is such a structure, wherein, the ballast water flows into the ultraviolet sterilizer (300) from top, treated with ultraviolet irradiation, and then discharged from the top of ultraviolet sterilizer (300).

The system in the present invention can be designed into a structure suitable for installation at hazardous area of ships, and is an explosion-proof component.

Figure 17:
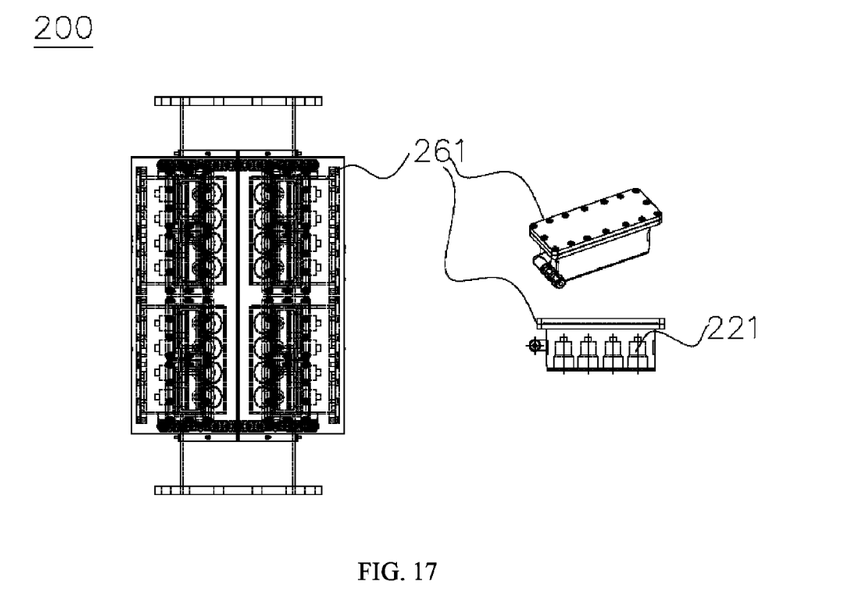
FIG. 17 is a longitudinal section view of the explosion-proof ultrasonic sterilizer.

FIG. 17 is a conceptual longitudinal section view of the explosion-proof ultrasonic sterilizer, which is equipped with an explosion-proof protective cover (261) for the purpose of explosion protection.

Figure 18:
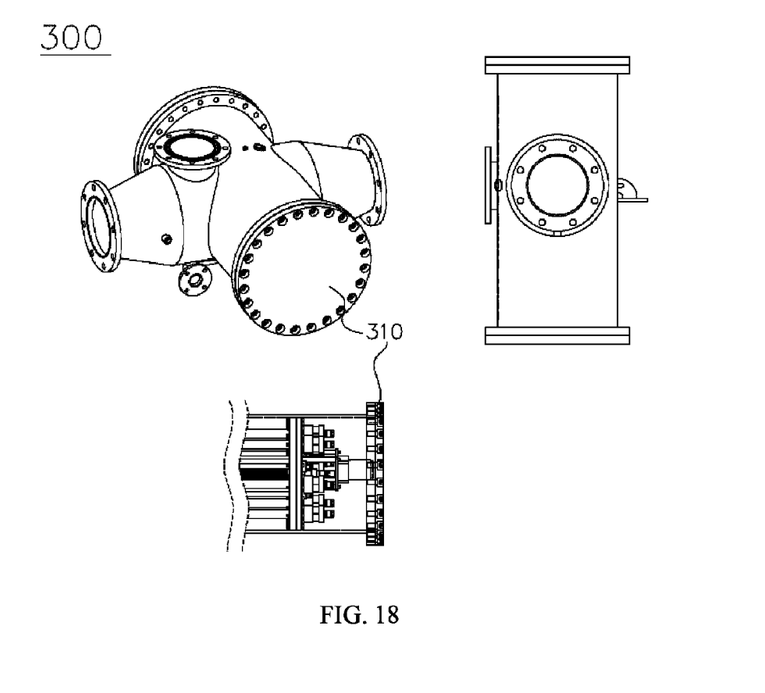
FIG. 18 is a front view of the explosion-proof ultrasonic sterilizer.

FIG. 18 shows oblique view and side view of the explosion-proof ultraviolet sterilizing equipment, which is equipped with an explosion-proof cover plate (310) for the purpose of explosion-proof.

While the above description of present invention is only for illustration, those skilled in the art can be change the above structure into other structures easily, without departing from the spirit or essential features of the present invention. Therefore, it should be understood that all the embodiments described above are illustrative but not limitative. For example, each component described collectively can be implemented separately; likewise, components described separately can be implemented in combination.

The protection scope of the present invention should be only confined by the claims, instead of above detailed description; all modifications or deformations of the embodiments are within the protection scope of the present invention.

Test Result

A land-based test is carried out for the ballast water treatment system provided in the present invention, according to the Guideline for Approval of Ballast Water Management System (G8) issued by the International Maritime Organization (IMO). The test result is shown in Table 1.

TABLE 1

|  | Influent water | Control Water | Treated Water (this Invention) | IMO Standard | California Standard |
|---|---|---|---|---|---|
| High Salinity (Average 32.8 PSU) | | | | | |
| *Vibrio cholerae* [cfu/100 mL] | 5.9+E6 | 6.7+E5 | 0 | <1 | <1 |
| *Escherichia coli* [cfu/100 mL] | 1.85+E4 | 3.0+E3 | 4 | <250 | <126 |
| *Enterococcus* [cfu/100 mL] | 1.0+E3 | 1.0+E3 | 0.6 | <100 | <33 |
| Planktonic organisms 10-50 µM [counts/mL] | 5,780 | 1,510 | 0 | <10 | <0.01 |
| Planktonic organisms >50 µm [counts/m$^3$] | 4.66+E5 | 2.25+E4 | 0 | <10 | 0 |
| Low Salinity (Average 17.2 PSU) | | | | | |
| *Vibrio cholerae* [cfu/100 mL] | 9.3+E5 | 1.1+E6 | 0 | <1 | <1 |
| *Escherichia coli* [cfu/100 mL] | 9.0+E3 | 1.3+E3 | 4.8 | <250 | <126 |
| *Enterococcus* [cfu/100 mL] | 178 | 541 | 0.8 | <100 | <33 |
| Planktonic organisms 10-50 µm [counts/mL] | 7,680 | 1,124 | <0.01 | <10 | <0.01 |
| Planktonic organisms >50 µm [counts/m$^3$] | 1.7+E6 | 6.95+E5 | 0 | <10 | 0 |

INDUSTRIAL APPLICABILITY

The system provided in the present invention is for use on ships to treat ballast water (sterilization and purification), to prevent environmental pollution resulted from charge of ballast water into the ballast tank or discharge of ballast water from the ballast tank.

[Table of Comparison with Other Techniques]

| Country | BWMS | Key Applied Technique | Advantages and Disadvantages |
|---|---|---|---|
| Korea | Electro-Clean Techcross Co., Ltd. | Electrosterilization | Single system: Main streamline flow without prefilter<br>High cost incurred by electrode exchange and neutralization |
| | NKO3 (BlueBallast) NK Co., Ltd. | Ozonization | Sanitizer is not required: O$_3$ is generated automatically.<br>Ration supply of high density O$_3$<br>High cost incurred by neutralization |
| | GloEn-Patrol Panasia Co., Ltd. | Automatic backlash filter<br>UV (medium voltage) | The active substance can be controlled easily<br>Hard to maintain filter efficiency |
| | EcoBallast HHI | Automatic backlash filter<br>UV (medium voltage) | The active substance can be controlled easily<br>Hard to maintain filter efficiency |

[Table of Comparison with Other Techniques]

| Country | BWMS | Key Applied Technique | Advantages and Disadvantages |
|---|---|---|---|
| Japan | Special-Pipe JAMS | Cavitation & $O_3$ | Sanitizer is not required: $O_3$ is generated automatically. Very complex system Large noise and high cost incurred by high pressure |
| | Hybrid BWTS Mitsubishi Group | Electrosterilization | Single system: Supply without prefilter High cost incurred by neutralization |
| | ClearBallast Hitachi Group TG Ballastcleaner and TG Environmental Guard Toagosei Group | Linking system $(Fe_3O_4, [Al(OH_2)_6]^{3+})$ Adding system $(NaClO, Na_2SO_3)$ | Very low operation speed: 3 minutes Large size Continuous supply of chemicals Hazard in storage and management of chemicals |
| Sweden | PureBallast Alfa Laval Co., Ltd. | UV and $TiO_2$ | The active substance can be controlled easily Hard to maintain AOT efficiency |
| | EctoSys (CleanBallast) Permascand AB | Electrochemical sterilization | Single system: Supply without prefilter High cost incurred by neutralization |
| German | Peraclean Degussa GmbH | Adding system (15% $C_2H_4O_3$, 14.3% $H_2O_2$, 26.5% $CH_3COOH$) | Continuous supply of chemicals Explosion-proof in ship environment |
| | Ecochlor Ecochlor GmbH | Adding system with $NaClO_3, H_2O_2\&H_2SO_4$ ($ClO_2$) | Continuous supply of chemicals Hazard in storage and management of chemicals |
| Norway | Ocean Saver OceanSaver Co., Ltd. | Hydraulic cavitation Supersaturation nitrogen Electrochemical sterilization | Very complex system High cost incurred by neutralization |
| Netherlands | Greenship Greenship Co. Ltd. | Electrosterilization | Single system: Supply without prefilter High cost incurred by neutralization |
| USA | Hyde GURDIAN Hyde Marine Co., Ltd. | Automatic backlash filter UV (medium voltage) | Hard to maintain filter efficiency (disc filter) |
| South Africa | Resource Ballast Technologies System Resource Ballast Technologies (Pty) Ltd. | Cavitation Electrochemical sterilization Ozone | Very complex system High cost |
| | Blue Ocean Shield China Ocean Shipping Co. & Tsinghua University | Aqueous medium cyclone & screen filter UV (low voltage) | Large size due to screen filter and low voltage UV High cost due to screen filter and low voltage UV |
| China | BSKY™ BWMS(this invention) Wuxi BRIGHTSKY Electronic CO., LTD. | Water cyclone & US filter UV (medium voltage) | Without active substance and byproduct Without chemical additive, without harm to human being and sea area Low power consumption and low cost Little or no maintenance Low consumption Explosion-proof |

The invention claimed is:

1. A ballast water treatment system, comprising a centrifugal separator, an ultrasonic sterilizer, and an ultraviolet sterilizer, wherein:

the centrifugal separator is designed to separate large-particle foreign matter from the ballast water by centrifugal separation due to a density difference of the large-particular foreign matter;

the ultrasonic sterilizer is arranged at a back of the centrifugal separator, and is designed to carry out ultrasonic sterilization of the ballast water passing through the centrifugal separator;

the ultrasonic sterilizer comprises a pipe that is used for sterilization of the ballast water and an ultrasonic irradiation unit that performs ultrasonic irradiation of the ballast water in the pipe;

the ultraviolet sterilizer is designed to accomplish sterilization by ultraviolet irradiation of the ballast water passing through the ultrasonic sterilizer;

the ultrasonic irradiation unit comprises: a first plurality of ultrasonic vibrators that generate ultrasonic vibration and a plurality of vibrating plates, each respective vibrating plate of the plurality of vibrating plates is arranged at a fore-end of each of a second plurality of ultrasonic vibrators of the first plurality of ultrasonic vibrators and is designed to transfer an ultrasonic wave generated by the second plurality of ultrasonic vibrators to the ballast water passing through the pipe; and the plurality of vibrating plates are aligned along a length direction of the pipe for sterilization, and are arranged along a circumference of the pipe for sterilization, and the second plurality of ultrasonic vibrators is arranged in a length direction of the respective vibrating plate of the plurality of vibrating plates.

2. The ballast water treatment system according to claim 1, wherein, the first plurality of ultrasonic vibrators comprises a plurality of high-frequency vibrators and a plurality of low-frequency vibrators, which are arranged alternately along the circumference of the pipe.

3. The ballast water treatment system according to claim 2, wherein, in order to transfer the ultrasonic wave in the pipe for sterilization, a roll shape metal mesh is arranged inside of the pipe for sterilization and tangent to the plurality of vibrating plates.

4. The ballast water treatment system according to claim 1, wherein, an acoustic material is arranged inside of the ultrasonic sterilizer, and a protective cover that envelops the first plurality of ultrasonic vibrators is arranged outside of the pipe for sterilization.

5. The ballast water treatment system according to claim 1, wherein the centrifugal separator comprises a discharge pipe having a diameter, and wherein the diameter of discharge pipe of the centrifugal separator increases gradually such that a flow velocity of fluid flowing through the discharge pipe increases gradually, thereby increasing centrifugal force.

6. The ballast water treatment system according to claim 1, wherein, an explosion-proof protective cover for the ultrasonic irradiation unit is arranged on the ultrasonic sterilizer.

7. The ballast water treatment system according to claim 1, wherein, the ultraviolet sterilizer is further equipped with an explosion-proof cover plate.

8. The ballast water treatment system according to claim 2, wherein, an acoustic material is arranged inside of the ultrasonic sterilizer, and a protective cover that envelops the first plurality of ultrasonic vibrators is arranged outside of the pipe for sterilization.

9. The ballast water treatment system according to claim 3, wherein, an acoustic material is arranged inside of the ultrasonic sterilizer, and a protective cover that envelops the first plurality of ultrasonic vibrators is arranged outside of the pipe for sterilization.

* * * * *